US007983669B2

(12) United States Patent
Kottke et al.

(10) Patent No.: US 7,983,669 B2
(45) Date of Patent: Jul. 19, 2011

(54) METHOD FOR VERIFYING PLOTTING RESULTS

(75) Inventors: Thomas Kottke, Ehningen (DE);
Norbert Jung, Markdorf (DE);
Siegfried Kienle, Salem (DE)

(73) Assignee: EADS Deutschland GmbH, Ottobrunn (DE)

( * ) Notice: Subject to any disclaimer, the term of this patent is extended or adjusted under 35 U.S.C. 154(b) by 410 days.

(21) Appl. No.: 12/097,864

(22) PCT Filed: Dec. 8, 2006

(86) PCT No.: PCT/DE2006/002183
§ 371 (c)(1),
(2), (4) Date: Sep. 12, 2008

(87) PCT Pub. No.: WO2007/073715
PCT Pub. Date: Jul. 5, 2007

(65) Prior Publication Data
US 2009/0054080 A1    Feb. 26, 2009

(30) Foreign Application Priority Data
Dec. 22, 2005    (DE) .......................... 10 2005 061 391

(51) Int. Cl.
*H04Q 7/20*    (2006.01)

(52) U.S. Cl. ....... 455/423; 455/456.1; 455/65; 342/457; 343/766

(58) Field of Classification Search .................. 455/428, 455/65, 456.1, 423; 342/457; 343/766
See application file for complete search history.

(56) References Cited

U.S. PATENT DOCUMENTS 6,078,788 A * 6/2000 Haardt ............................ 455/65
7,265,728 B1 * 9/2007 Tsao ............................ 343/766

FOREIGN PATENT DOCUMENTS

| JP | 5-203714 A | 8/1993 |
| WO | WO 95/14935 A1 | 6/1995 |
| WO | WO 96/31010 A1 | 10/1996 |
| WO | WO 98/29755 A1 | 7/1998 |
| WO | WO 99/33302 A2 | 7/1999 |

OTHER PUBLICATIONS

International Search Report dated Apr. 4, 2007 (five (5) pages).

* cited by examiner

*Primary Examiner* — Charles Shedrick
(74) *Attorney, Agent, or Firm* — Crowell & Moring LLP

(57) ABSTRACT

A method is provided for verifying plotting results when multiple signals of the same frequency have been detected from different directions. Signal characteristics of the signals detected from different directions are compared so that, on the basis of the signal comparison, a decision may be made as to whether a reflection from the same transmitter is occurring, or different transmitters are involved.

14 Claims, 4 Drawing Sheets a)

b)

METHOD FOR VERIFYING PLOTTING RESULTS

This application is the U.S. national phase of international patent application PCT/DE2006/002183, filed Dec. 8, 2006, the entire disclosure of which is hereby incorporated by reference, and claims priority to German patent application 10 2005 061 391.8, filed Dec. 22, 2005.

BACKGROUND AND SUMMARY OF THE INVENTION

This invention relates to a method for verifying plotting results.

Modern plotters make it possible to reliably detect individual signals in the case of multiple-wave incidence. Many plotters currently perform such multiple-wave detection using a circular array of antennas. It is also possible to localize signals at the same frequencies coming from different directions. However, in such multiple-wave detection at the same frequency, it is not possible to differentiate whether there are two different transmitters or whether reflections from the same transmitter, e.g., from a high-rise building or mountain, are involved.

In mobile wireless communication, such situations involving multiple-wave incidence at the same frequency are handled by processing only one of the received signals (generally the signal with the higher level) and suppressing the other signals (referred to as multiple-wave suppression). However, further investigation as to whether the same or different transmitters are involved is not made.

An object of this invention is to provide a method by which, in cases of multiple-wave incidence at the same frequency, on the basis of reflection from surroundings, a rapid and reliable determination may be made as to whether the same or different transmitters are involved.

This object is achieved by way of the claimed subject matter, with advantageous embodiments of the invention forming the subject matter of dependent claims.

The invention concerns plotter results of the type generated from a conventional plotter. Thus, in the case of multiple-wave incidence at the same frequency, multiple detected signals of the same frequency, but from different directions, are initially present. In order to clarify whether these are signals from the same transmitter, in the event that the signals have been reflected from an object or are signals from different transmitters, the invention provides for a comparison of the signal characteristics of the signals detected from the different directions.

The following signal characteristics may be used in the comparison to be performed:

Response of the signal level over time (in particular for pulse-modulated signals),
Frequency spectrum (in particular for broadband transmitters),
Modulation parameters and modulation errors (e.g., error vector),
Demodulated baseband signal, and
Data content of the signal (if demodulation is possible).

The reception of the signal samples needed for the comparison, as well as the comparison itself, may be carried out in a particularly advantageous manner as follows.

Each of the signals detected from different directions is preferably received simultaneously via a separate antenna. Generally used for this purpose are directional antennas, which are oriented in the appropriate directions (the directional information is present as a result from the plotting process provided upstream). The signals received in this manner are then compared to one another, in each case in pairs. The sequence of the comparison of the individual signal pairs is advantageously set according to a predetermined algorithm, which takes into account the relative strength of the signals. Thus, to begin with, the strongest signal may advantageously be compared to the weakest signal, the second-strongest signal compared to the second-weakest signal, the third-strongest signal compared to the third-weakest signal, etc.

A directly received signal and a reflected signal have greatly different signal levels, the difference being in the range of several dB, typically more than 10 dB.

It is assumed that the signal with the highest level has been directly received, whereas the weaker signal has been received with a time delay on account of the longer path length. Accordingly, for a signal comparison, one starts with the last signal segment, in terms of time, of the weaker signal, and this is compared to the individual signal segments of the stronger signal, starting from the last signal segment, in terms of time, of the stronger signal, progressively proceeding in the opposite time direction. If there is a match, the comparison of signals may be terminated. Of course, in order to exclude coincidental matches, the method may also be continued until a match results in more than one signal segment. If there is no match, the method is continued using the next signal segment (in this case, the next-to-last signal segment, in terms of time, of the weaker signal), which according to the sequence (in terms of time, from back to front) is compared to the individual signal segments of the stronger signal.

In a manner completely analogous to the described method, one may also start with the first signal segment, in terms of time, of the stronger signal, and compare that segment to the individual signal segments of the weaker signal, starting from the first signal segment, in terms of time, of the weaker signal, progressively proceeding in the time direction.

The number of comparisons to be performed may be reduced by use of the described procedure.

In the special case of exactly two detected signals having different levels, the signal with the higher level may be received via a nondirectional antenna. In this case, the weaker signal may be easily suppressed as a result of the different levels. The signal with the lower level is received via a directional antenna oriented in the known direction of incidence of this signal.

If the two signals to be compared have identical or similar signal levels, the two signals are received in each case via a directional antenna oriented in the known reception direction.

By use of signal filtering methods it is also possible to receive the two signals in each case via a nondirectional antenna, thus allowing the use of directional antennas to be omitted.

If the number of signals detected from different directions is greater than the number of antennas present for reception thereof, initially, the number of signals simultaneously received corresponds to the number of antennas present. Two signals in each case are then compared as described above. The sequence of the signal pairs to be compared may be set according to a predetermined algorithm which takes into account the relative strength of the signals. It is advantageous for the strongest signal and the weakest signal to be simultaneously received and compared, and the second-strongest signal and the second-weakest signal to be simultaneously received and compared, etc.

However, instead of a new reception of the detected signals, according to one alternative embodiment, the signal characteristics may be compared on the basis of temporarily stored raw signal data from the plotting process provided upstream from the method according to the invention.

By use of a method according to the invention, a rapid and reliable determination may be made as to whether a second transmitter, or only a reflection from the first transmitter, is involved. In this manner the positional image of a plot is more definitive, which is of great importance for problematic environmental influences (cities with numerous transmitters and reflections, mountains with numerous reflections, etc.). In many cases, this information may be obtained without identifying the type of modulation, or even demodulating the information.

The invention is explained in greater detail by describing exemplary embodiments and with reference to the drawing figures.

DETAILED DESCRIPTION OF THE INVENTION

Figure 1:
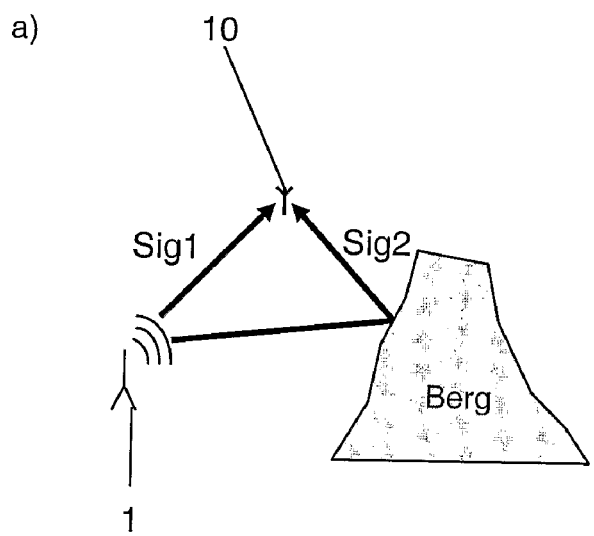
FIG. 1 shows multipath reception at identical frequencies, based on two transmitters (FIG. 1b) and based on a reflection (FIG. 1a)
Figure 1:
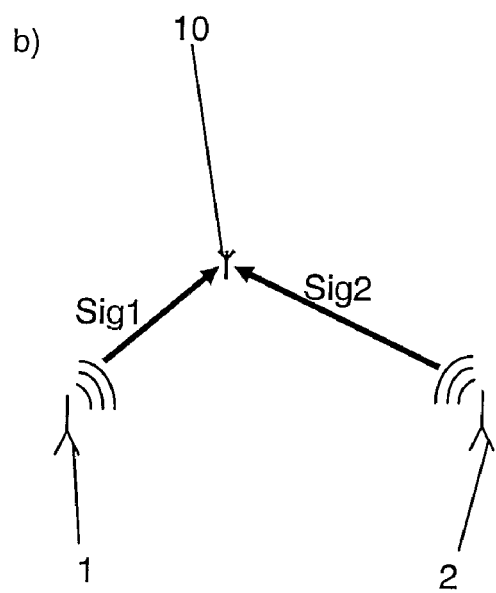

FIG. 1 shows, as previously explained, two cases which are to be differentiated by use of the method according to the invention. During plotting using a plotting antenna 10, when multiple signals Sig1, Sig2 of the same frequency are detected from different directions, plotting may involve either the same transmitter 1, whose signals have been reflected from a mountain, e.g., (FIG. 1a), or two different transmitters 1, 2 (FIG. 1b).

Figure 2:
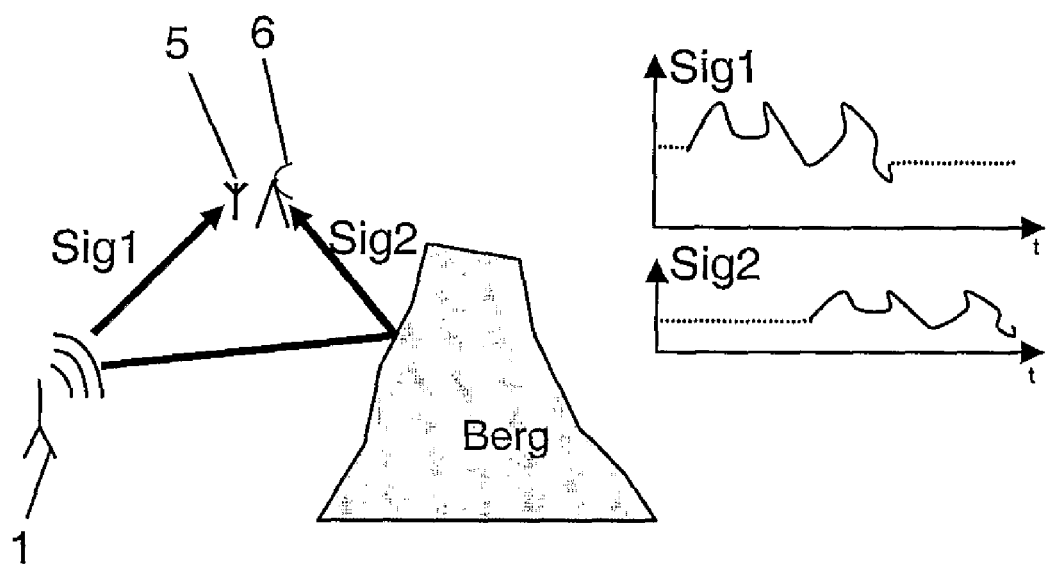
FIG. 2 shows reception of the weaker signal via a directional antenna, and reception of the stronger signal via a nondirectional antenna (when a single transmitter is present)

FIG. 2 shows a specific situation for use of the method according to the invention. The plotting process provided upstream from the plotting method according to the invention has determined as plotting results two signals Sig1, Sig2 from different directions, but having the same frequency. The signal levels were of different magnitudes. To verify these plotting results, by use of the method according to the invention, the stronger of the two signals, namely, signal Sig1, is received via a nondirectional antenna 5. The nondirectional antenna 5 may advantageously be the same plotting antenna used to carry out the plotting process provided upstream from the method according to the invention. This may be, for example, a circular array of antennas. Subsequently or simultaneously, a directional antenna 6 is oriented in the known direction of the second signal Sig2, and Sig2 is received. The signal curves for Sig1 and Sig2 as a function of time are schematically illustrated in FIG. 2. It is shown that Sig2 is delayed in time with respect to Sig1, and is received in a damped form. However, a comparison of individual signal samples of the two signals shows that the characteristics of the two signals as a function of time are otherwise identical. It is thus possible to verify with high probability that the same transmitter 1 is involved for both signals. A coincidental match in only one signal sample may be excluded by comparing multiple signal samples.

Figure 3:
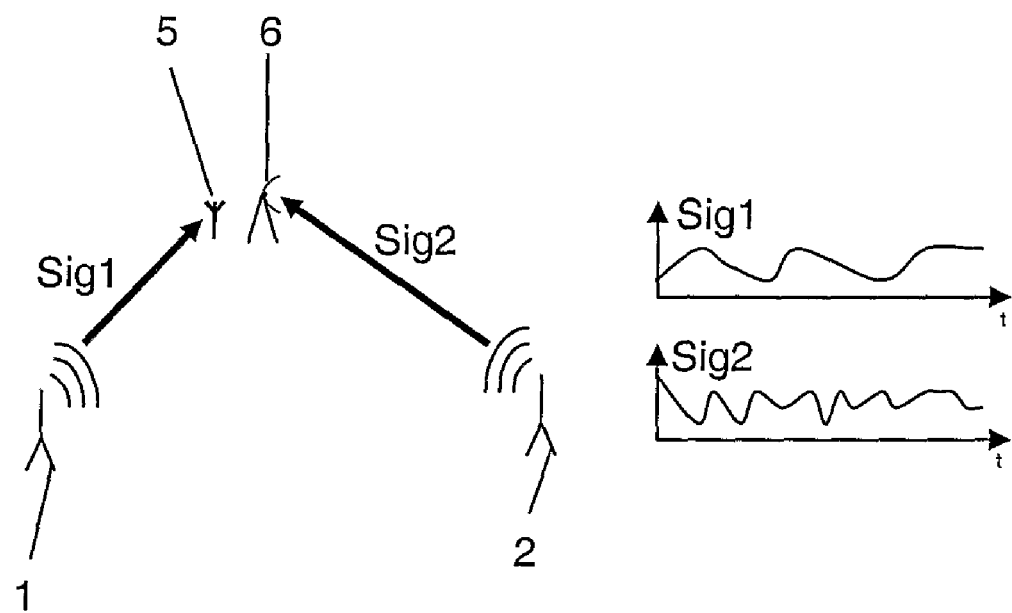
FIG. 3 shows reception of the weaker signal via a directional antenna, and reception of the stronger signal via a nondirectional antenna (when two transmitters are present)

FIG. 3 shows a situation in which the signals determined by the plotting process originate from two different transmitters 1, 2. The signal curves for the two signals Sig1 and Sig2 as a function of time are once again schematically illustrated (not to scale). After the two signals have been received via directional antenna 5 and via nondirectional antenna 6, the comparison of the two signals Sig1, Sig2 may be performed. In the present case, on the basis of the time curve of the signal level, this comparison clearly shows that there are no similarities, and therefore two different transmitters 1, 2 must be involved.

Figure 4:
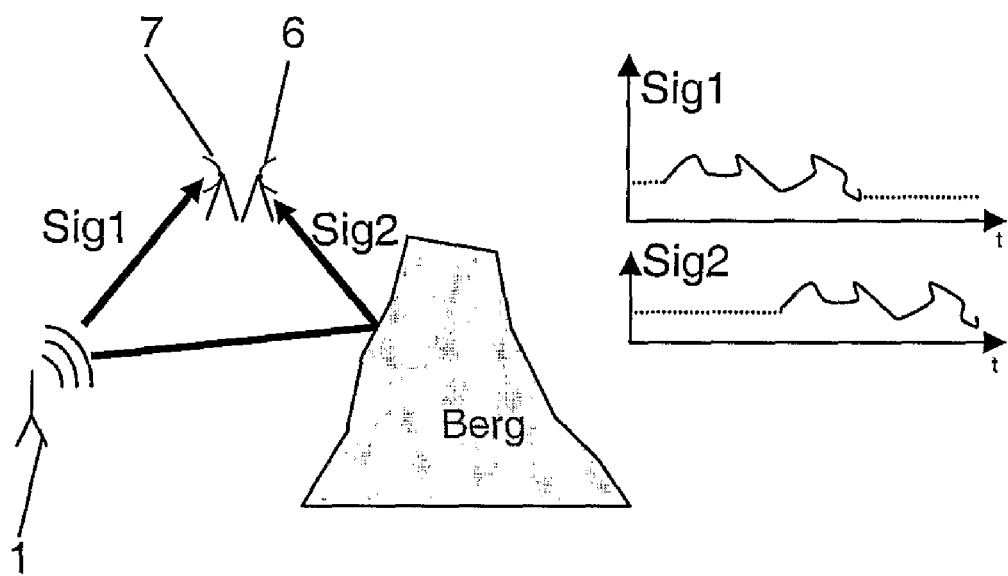
FIG. 4 shows reception of two signals having comparable signal levels, via two directional antennas.

FIG. 4 shows the case in which the signals Sig1, Sig2 determined by the plotting process have identical or approximately identical signal levels. Since in this case it is no longer possible to easily separate the two signals Sig1, using a nondirectional antenna, the two signals are received in each case via a directional antenna 7, 6, respectively.

The invention claimed is:

1. A method for verifying plotting results of a multipath signal system with at least one transmitter and at least one reception antenna when multiple signals of the same frequency are detected from different directions, comprising:
comparing signal characteristics of the signals detected from different directions, and
determining, based on the signal characteristic comparison, whether a reflection from the same transmitter is occurring or different transmitters are involved,
wherein each of the signals detected from different directions is received via a separate antenna, and wherein the received signals are then compared to one another,
wherein the signals are compared in pairs, and
wherein a sequence of signal pair comparison is set according to a predetermined algorithm that takes into account relative strengths of the signals.

2. The method according to claim 1, wherein the signal characteristics include at least one of response of a signal level over time, a frequency spectrum, modulation parameters, a baseband signal, and a data content of the signal.

3. The method according to claim 1, wherein the strongest signal is first compared to the weakest signal, and the second-strongest signal is next compared to the second-weakest signal.

4. The method according to claim 1, wherein when exactly two signals detected from different directions have different signal levels, the stronger signal is received via a nondirectional antenna and the weaker signal is received via a directional antenna, and wherein the received signals are then compared to one another.

5. The method according to claim 1, wherein when exactly two signals detected from different directions have identical signal levels, two signals in each case are received via a directional antenna, and wherein the received signals are then compared to one another.

6. The method according to claim 1, wherein when the number of signals detected from different directions is greater than the number of antennas used for reception thereof, the sequence of reception and comparison of the individual signal pairs is set according to a predetermined algorithm that takes into account relative strengths of the signals.

7. The method according to claim 6, wherein the strongest signal and the weakest signal are simultaneously received and compared, and the second-strongest signal and the second-weakest signal are simultaneously received and compared.

8. The method according to claim 1, wherein the signal characteristics are compared based on temporarily stored raw signal data from the plotting process provided upstream.

9. The method according to claim 6, wherein the strongest signal is first compared to the weakest signal, and the second-strongest signal is next compared to the second-weakest signal.

10. The method according to claim 6, wherein when exactly two signals detected from different directions have different signal levels, the stronger signal is received via a nondirectional antenna and the weaker signal is received via a directional antenna, and wherein the received signals are then compared to one another.

11. The method according to claim 6, wherein when exactly two signals detected from different directions have identical signal levels, two signals in each case are received via a directional antenna, and wherein the received signals are then compared to one another.

12. The method according to claim 2, wherein when the number of signals detected from different directions is greater than the number of antennas used for reception thereof, the sequence of reception and comparison of the individual signal, pairs is set according to a predetermined algorithm that takes into account relative strengths of the signals.

13. The method according to claim 12, wherein the strongest signal and the weakest signal are simultaneously received and compared, and the second-strongest signal and the second-weakest signal are simultaneously received and compared.

14. The method according to claim 2, wherein the signal characteristics are compared based on temporarily stored raw signal data from the plotting process provided upstream.

\* \* \* \* \*